July 10, 1923.
G. C. ROBBINS
RADIUS LEAF
Filed March 9, 1922
1,461,497
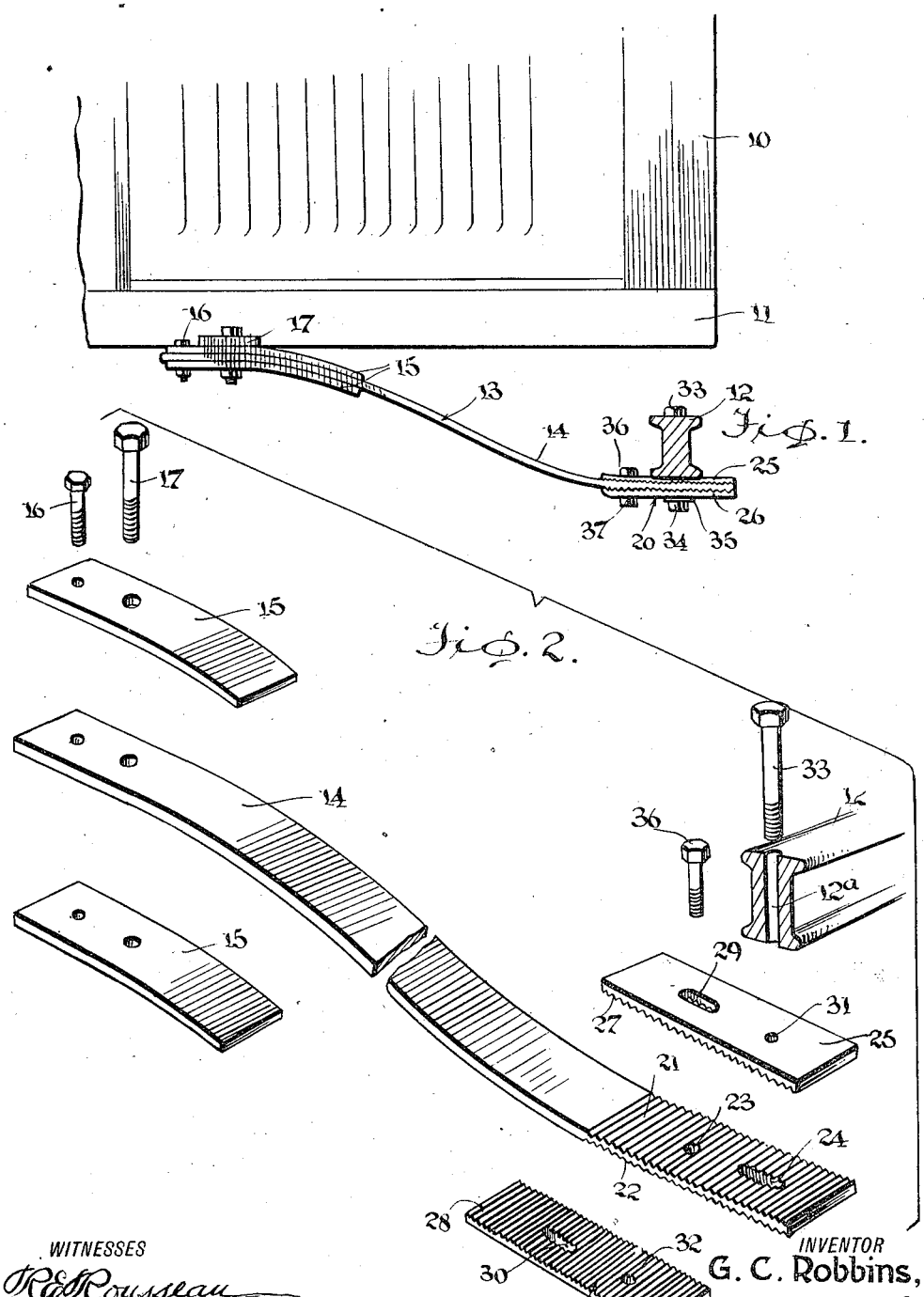
WITNESSES
INVENTOR
G. C. Robbins,
ATTORNEYS Patented July 10, 1923.

1,461,497

UNITED STATES PATENT OFFICE.

GROVER C. ROBBINS, OF BLOWING ROCK, NORTH CAROLINA.

RADIUS LEAF.

Application filed March 9, 1922. Serial No. 542,513.

*To all whom it may concern:*

Be it known that I, GROVER C. ROBBINS, a citizen of the United States, and a resident of Blowing Rock, in the county of Watauga and State of North Carolina, have invented certain new and useful Improvements in Radius Leaves, of which the following is a specification.

This invention relates in general to an improvement in radius leaves and more particularly to a radius leaf adjustment especially adapted for use with the front axle assembly of automobiles or the like.

Heretofore in the art such radius leaf constructions as have been proposed have been rigid and incapable of adjustment and after the automobile with which they are organized has been in use for sometime it frequently happens that the front axle becomes out of alinement, and consequently steering of the automobile becomes difficult and dangerous.

One of the principal objects of the present invention is to provide a radius leaf of this character which embodies a radius leaf adjustment by means of which the axle may be readily and conveniently alined, the radius leaf being however securely and properly associated with the chassis and with the front axle assembly after the adjustment has been completed so that its capacity also to carry out the functions of a rigid radius leaf are in nowise impaired by its capability for adjustment to bring about alinement of the axle and proper organization of the associated elements.

Another object is to provide a radius leaf adjustment of this character which is of extremely simple and durable construction, reliable in operation and easy and comparatively inexpensive to manufacture and install.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmentary view, showing the invention applied to an automobile, parts being shown in section for the sake of illustration;

Figure 2 is a group view in perspective, illustrating the parts of the invention prior to assembly.

In practice it will be understood that the invention is preferably used with a "Model 4, Overland automobile" although it is to be understood that the invention is not to be restricted to this use.

Referring to the drawings wherein for the sake of illustration is shown the preferred embodiment of the invention the numeral 10 designates generally a portion of an automobile which as usual includes a chassis or frame 11 with which the front axle assembly 12 is organized in the usual manner. A radius leaf, designated generally at 13 is provided and is connected at its ends with a chassis 11 and axle 12. The radius leaf 13 embodies a main leaf 14 and at one end this main leaf has associated therewith short leaves 15 which are secured in proper relation to a main leaf by means of a bolt and nut 16. The end of the radius leaf with which the short leaves 15 are secured is connected to the chassis 11 and preferably by means of a lug or bracket 17 rigidly secured or connected to the chassis and the bolt and nut 18 is supported upon the bracket and clamps or secures the main leaf and short leaves 15 thereto, as shown in Figure 1. It is to be understood of course that the short leaves and main leaf are provided with bolt holes to accommodate the bolts 16 and 18, as clearly shown in Figure 2.

The end of the radius leaf, opposite to that with which it is connected with the chassis, is connected to the axle 12 by means of the radius leaf adjustment designated generally at 20. This radius leaf adjustment is provided by serrating or forming transverse ridges 21 and 22 upon the opposite faces of the main leaf 14, as clearly shown in Figure 2, and by forming a bolt hole 23 and an elongated slot 24 in this main leaf 14. Combined clamping plates and leaves, designated at 25 and 26 are provided and are adapted to be associated with the upper and lower faces respectively of the end of the main leaf 14. The faces or surfaces of the combined leaves and clamping plates 25 which contact with the main leaf 14 are formed with serrations or transverse ridges, designated at 27 and 28 which serrations or transverse ridges are of corresponding formation with respect to the transverse serrations 21 and 22 of the main leaf and which are adapted to respectively mesh with their corresponding serrations on the main leaf. The plate 25 is provided with an elongated slot 29 and adapted to overlie the bolt holes 23 of the main leaf and similarly the plate 26 is provided with an elongated slot 30 adapted to underlie the bolt hole 23 and to be in vertical alinement with the slot 29. The plate 29 is also provided with a bolt holes 31 adapted to overlie the slot 24 of the main leaf and similarly the plate 26 is provided with a bolt hole 32 adapted to underlie the slot 24 of the main leaf and to be in alinement with the bolt hole 31 of the plate 25. The clamping plate 25 and 26 and the serrated end of the main leaf 14 underlie the axle 12 and are secured to this axle by means of the bolt 33 extending through the alined bolt hole 12ᵃ provided in the axle and through eye-bolt holes 31 and 32 of the plates 25 and 26 and through the intermediate slot 24 of the main leaf 14, the lower end of the bolt 33 being threaded and having a nut 34 thereon which through the medium of a washer 35 clamps the plates 25 and 26 and the leaf 14 to the axle. When so clamped the serrations 27 and 21 and 28 and 22 are meshed, as shown in Figure 1. The combined leaves and plates 25 and 26 are further organized and secured in position by means of the short bolt 36 and nut 37, the short bolt 36 operating through the slots 29 and 30 and intermediate bolt hole 23 and thus serving to insure the mesh of the serrations of the plate and main leaf and to completely organize the plates and the main leaf.

It is obvious that adjustment of the radius leaf may be carried out to aline the axle when this is necessary by loosening the nuts 34 and 37 and shifting the main leaf 14 relative to the clamping plates 25 and 26. When the main leaf 14 is so shifted it carries the bolt 36 with it and the bolt 36 is free to partake of this action by virtue of the fact that it operates in the slots 29 and 30 of the plates 25 and 26. The main leaf 14 must however move relative to the bolt 33 and this may be done by virtue of the fact that this bolt 33 extends through the elongated slot 24 of the main leaf. The bolt 33 also functions to prevent longitudinal movement of the plates 25 and 26 since it extends through the bolt holes 31 and 32 of these plates. When the desired adjustment has been made the bolts 34 and 37 are tightened and when so tightened they again cause the serrations of the plates and main leaf to come into mesh and also secure the entire leaf to the axle assembly. It is to be noted that while the plates 25 and 26 have as a primary function the clamping of the main leaf 14 in adjusted position that they also serve as short leaves in the radius leaf assembly and they strengthen the radius leaf at the point where it is subjected to relatively great strain.

I claim:

1. In a radius leaf adjustment, a main leaf having an end provided with serrations on its upper and lower face and having a bolt hole and an elongated slot, a pair of clamping plates, the upper clamping plate having serrations on its under face engageable with the serrations on the top face of the main leaf, the lower clamping plate having serrations on its upper face engageable with the serrations on the lower face of the main leaf, said clamping plates having elongated slots adapted to be alined with the bolt hole of the main leaf and having bolt holes adapted to be alined with the elongated slot of the main frame, a bolt extending through the slots of the clamping plates and the bolt hole of the main leaf, a nut engageable with the bolt for urging said clamping plates into engagement with the main leaf, the bolt holes of the clamping plate and the elongated slot of the main leaf being adapted to receive securing means.

2. The combination with a chassis and an axle, a radius leaf comprising a main leaf, a pair of short leaves secured to one end of said main leaf, means for securing said short leaves and said main leaf to said chassis, the opposite end of said main leaf having its upper and lower faces serrated, combined clamping plates and leaves having serrated faces adapted to mesh with the serrated faces of the main leaf, fastening means for securing the combined clamping plates and leaves in adjusted position to said main leaf, and fastening means for securing the combined clamping plates and leaves to the axle.

GROVER C. ROBBINS.